US006778358B1

(12) United States Patent
Jiang et al.

(10) Patent No.: US 6,778,358 B1
(45) Date of Patent: Aug. 17, 2004

(54) MAGNETICALLY SOFT, HIGH SATURATION MAGNETIZATION LAMINATES OF IRON-COBALT-NITROGEN AND IRON-NICKEL

(75) Inventors: Hai Jiang, Fremont, CA (US); Yingjian Chen, Fremont, CA (US); Xiaozhong Dang, Fremont, CA (US); Mohamad T. Krounbi, San Jose, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 256 days.

(21) Appl. No.: 10/137,030

(22) Filed: May 1, 2002

(51) Int. Cl.[7] .................................................. G11B 5/39
(52) U.S. Cl. ........................................................ 360/126
(58) Field of Search .............................. 360/126, 119, 360/125

(56) References Cited

U.S. PATENT DOCUMENTS

| | | | | |
|---|---|---|---|---|
| 4,589,042 A | | 5/1986 | Anderson et al. | ............ 360/125 |
| 5,606,478 A | | 2/1997 | Chen et al. | .................. 360/126 |
| 6,118,628 A | * | 9/2000 | Sano et al. | .................. 360/126 |
| 6,259,583 B1 | * | 7/2001 | Fontana et al. | ............. 360/126 |
| 6,449,122 B1 | * | 9/2002 | Yazawa et al. | ............. 360/126 |
| 6,490,131 B2 | * | 12/2002 | Sano et al. | .................. 360/126 |
| 6,538,845 B1 | * | 3/2003 | Watanabe et al. | ........... 360/126 |
| 6,541,065 B1 | * | 4/2003 | Sasaki et al. | ................ 427/130 |
| 6,680,831 B2 | * | 1/2004 | Hiramoto et al. | ...... 360/324.11 |

OTHER PUBLICATIONS

IEEE Transactions on Magnetics article entitled "Magnetic and Structural Properties of FeCoB Thin Films", by C. L. Platt et al., vol. 37, No. 4, Jul. 2001, pp. 2302–2304.
IEEE Transactions on Magnetics article entitled "Magnetic Properties of RF Diode Sputtered $Co_xFe_{100-x}$ Alloy Thin Films", by E. J. Yun et al., vol. 32, No. 5, Sep. 1996, pp. 4535–4537.

IEEE Transactions on Magnetics article entitled "Soft High Saturation Magnetization $(Fe_{0.7} Co_{0.3})_{1-x}N_x$", by N. X. Sun et al., vol. 36, No. 5, Sep. 2000, pp. 2506–2508.

IEEE Transactions on Magnetics article entitled "Magnetic Properties of FeCoV Film Sandwiched by Thin Soft–Magnetic Films", by T. Nozawa et al., vol. 37, No. 4, Jul. 2001, pp. 3033–3038.

IEEE Transactions on Magnetics article entitled "High Moment FeCoNi Alloy Thin Films Fabricated by Pulsed-Current Electrodeposition", by X. Liu et al., vol. 37, No. 4, Jul. 2001, pp. 1764–1766.

American Institute of Physics article entitled "Improvement of Soft Magnetism of $Fe_{90}Co_{10}$ Sputtered Films by Addition of N and Ta", by S. Nakagawa et al., J. Appl. Phys. 79 (8), Apr. 15, 1996, pp. 5156–5158.

Article entitled "Microstructures and Soft Magnetic Properties of High Saturation Magnetization Fe–Co–N Alloy Thin Films", by N. X. Sun et al., 12 pages, Apr. 2000.

* cited by examiner

*Primary Examiner*—Brian E. Miller
(74) *Attorney, Agent, or Firm*—Mark Lauer; Silicon Edge Law Group LLP (57) ABSTRACT

In one aspect, a laminated structure including a first plurality of layers containing primarily-iron FeCoN interleaved with a second plurality of layers containing primarily iron FeNi is disclosed. The structure has an easy axis of magnetization and a hard axis of magnetization, has a magnetic saturation of at least about twenty-three-thousand Gauss, and has a magnetic coercivity measured substantially along its hard axis of magnetization that is less than two Oersted. Additional elements can be added in minority concentrations to form primarily-iron FeCoN layers with increased resistivity. The laminated structure has applicability in various fields in which high saturation magnetization, magnetically soft materials are advantageous, particularly for inductive heads.

20 Claims, 5 Drawing Sheets

MAGNETICALLY SOFT, HIGH SATURATION MAGNETIZATION LAMINATES OF IRON-COBALT-NITROGEN AND IRON-NICKEL

TECHNICAL FIELD

The present invention relates to magnetic devices, for example electromagnetic transducers of disk or tape storage systems.

BACKGROUND OF THE INVENTION

Electromagnetic transducers such as heads for disk or tape drives commonly include Permalloy (approximately $Ni_{0.81}Fe_{0.19}$), which is formed in thin layers to create magnetic features. Permalloy is known to be magnetically "soft," that is, to have high permeability and low coercivity, allowing structures made of Permalloy to act like good conductors of magnetic flux. For example, an inductive head may have conductive coils that induce magnetic flux in an adjacent Permalloy core, that flux employed to magnetize a portion or bit of an adjacent media. That same inductive head may read signals from the media by bringing the core near the magnetized media portion so that the flux from the media portion induces a flux in the core, the changing flux in the core inducing an electric current in the coils. Alternatively, instead of inductively sensing media fields, magnetoresistive (MR) sensors or merged heads that include MR sensors may use thinner layers of Permalloy to read signals, by sensing a change in electrical resistance of the MR sensor that is caused by the magnetic signal.

In order to store more information in smaller spaces, transducer elements have decreased in size for many years. One difficulty with this deceased size is that the amount of flux that needs to be transmitted may saturate elements such as magnetic pole layers, which becomes particularly troublesome when ends of the pole layers closest to the media, commonly termed pole tips, are saturated. Magnetic saturation in this case limits the amount of flux that is transmitted through the pole tips, limiting writing or reading of signals. Moreover, such saturation may blur that writing or reading, as the flux may be evenly dispersed over an entire pole tip instead of being focused in a corner that has relatively high flux density. For these reasons the use of high magnetic saturation materials (also known as high moment or high $B_S$ materials) in magnetic core elements has been known for many years to be desirable.

For instance, iron is known to have a higher magnetic moment than nickel, so increasing the proportion of iron compared to nickel generally yields a higher moment alloy. Iron, however, is also more corrosive than nickel, which imposes a limit to the concentration of iron that is feasible for many applications. Also, it is difficult to achieve soft magnetic properties for primarily-iron NiFe compared to primarily-nickel NiFe. Anderson et al., in U.S. Pat. No. 4,589,042, teach the use of high moment $Ni_{0.45}Fe_{0.55}$ for pole tips. Anderson et al. do not use $Ni_{0.45}Fe_{0.55}$ throughout the core due to problems with permeability of that material, which Anderson et al. suggest is due to relatively high magnetostriction of $Ni_{0.45}Fe_{0.55}$.

As noted in U.S. Pat. No. 5,606,478 to Chen et al., the use of high moment materials has also been proposed for layers of magnetic cores located closest to a gap region separating the cores. Also noted by Chen et al. are some of the difficulties presented by these high moment materials, including challenges in forming desired elements and corrosion of the elements once formed. Chen et al. state that magnetostriction is another problem with $Ni_{0.45}Fe_{0.55}$, and teach the importance of constructing of heads having Permalloy material layers that counteract the effects of that magnetostriction. This balancing of positive and negative magnetostriction with plural NiFe alloys is also described in U.S. Pat. No. 5,874,010 to Tao et al.

Figure 11:
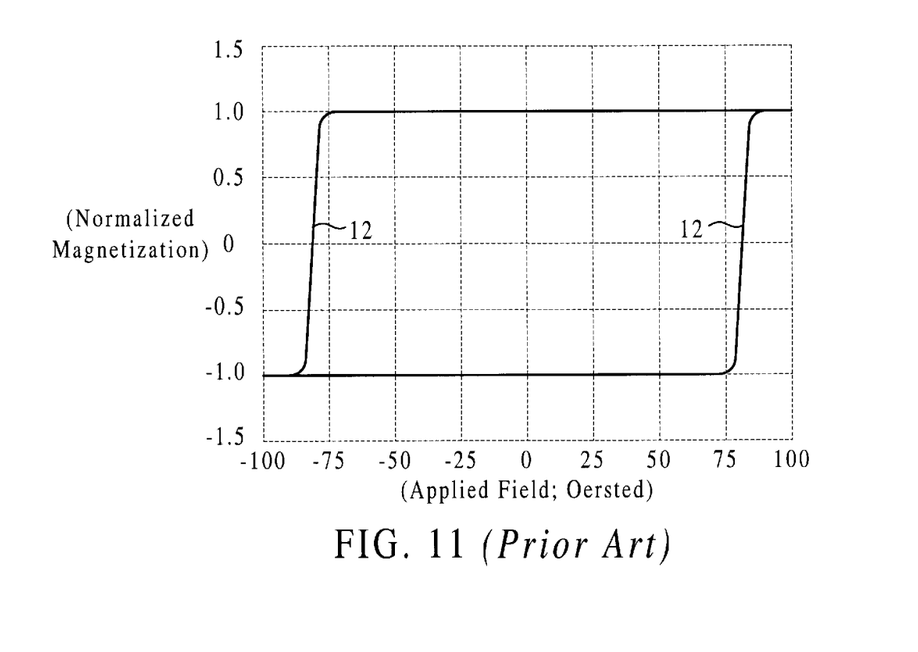
FIG. 11 is a B/H loop of a prior art FeCoN layer that was formed by sputtering deposition at room temperature.

Primarily iron FeCo alloys are known to have a very high saturation magnetization but also high magnetostriction that makes them unsuitable for many head applications. That is, mechanical stress during slider fabrication or use may perturb desirable magnetic domain patterns of the head. FIG. 11 shows a B/H loop 12 of a FeCoN layer that was formed by sputtering deposition at room temperature, the layer having a thickness of approximately 500 Å and having a composition of approximately $Fe_{0.66}Co_{0.28}N_{0.06}$. The applied H-field is shown in oersted (Oe) across the horizontal axis while the magnetization of the layer is plotted in normalized units along the vertical axis, with unity defined as the saturation magnetization for a given material. The FeCoN layer has a saturation magnetization ($B_S$) of approximately 24.0 kilogauss and is magnetically isotropic, as shown by the single B/H loop 12. B/H loop 12 also indicates a very high coercivity of about 80 oersted, which is unsuitable for applications requiring soft magnetic properties.

In an article entitled "Microstructures and Soft Magnetic Properties of High Saturation Magnetization Fe—Co—N alloy Thin Films," Materials Research Society, Spring meeting, Section F, April 2000, N. X. Sun et al. report the formation of FeCoN films having high magnetic saturation but also high magnetostriction and moderate coercivity. Sun et al. also report the formation of a thin film structure in which FeCoN is grown on and capped by Permalloy, to create a sandwich structure having reduced coercivity but compressive stress. The magnetostriction of this sandwich structure, while somewhat less than that of the single film of FeCoN, may still be problematic for head applications.

SUMMARY

In accordance with the present invention a laminated structure including a first plurality of layers containing primarily iron FeCoN interleaved with a second plurality of layers containing primarily iron FeNi is disclosed. The structure has an easy axis of magnetization and a hard axis of magnetization, has a magnetic saturation of at least about twenty-three-thousand Gauss, and has a magnetic coercivity measured substantially along its hard axis of magnetization that is less than two Oersted.

DETAILED DESCRIPTION

Figure 1:
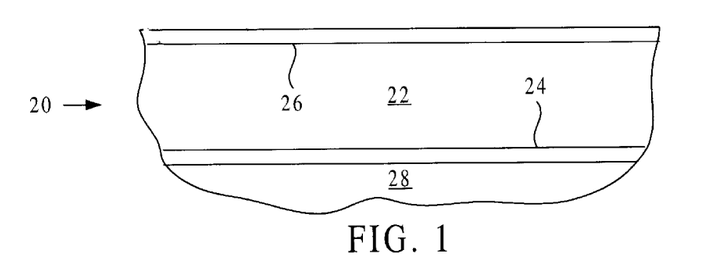
FIG. 1 is a cutaway cross-sectional view of a sandwich structure made of a primarily iron FeCoN layer affixed between a pair of primarily iron FeNi layers.

FIG. 1 is a cutaway cross-sectional view of a sandwich structure 20 made of a primarily iron FeCoN layer 22 affixed between a pair of primarily iron FeNi layers 24 and 26. The sandwich structure 20 is formed on a substrate 28 that provides a smooth surface promoting favorable crystallographic growth of layers 22, 24 and 26. The FeCoN layer 22 has a thickness of approximately 500 Å and has a composition of approximately $Fe_{0.67}Co_{0.29}N_{0.04}$. The FeNi layers 24 and 26 each have a thickness of approximately 50 Å and have a composition of approximately $Fe_{0.55}Ni_{0.45}$. Layers 22, 24 and 26 were formed by magnetron sputtering deposition at room temperature. Magnetron sputtering has a deposition rate that is approximately ten times faster than that of RF sputtering, which is an advantage in commercial applications such as magnetic head production. The substrate may be a silicon dioxide, alumina, chromium, tantalum or titanium, for example.

Figure 2:
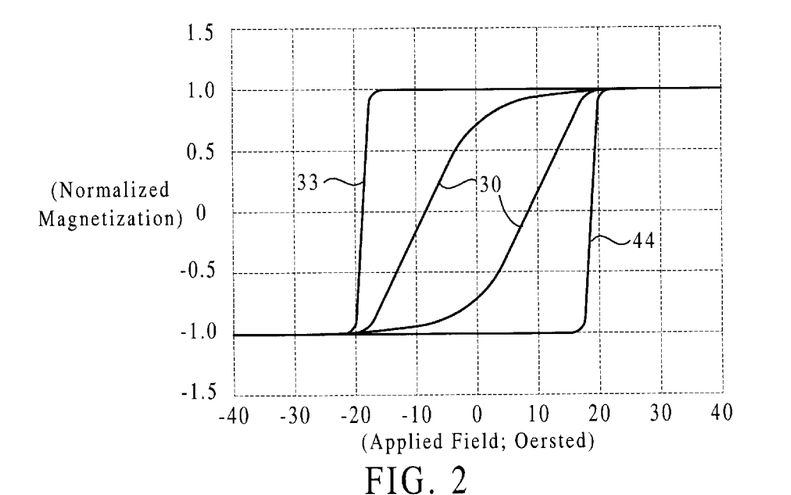
FIG. 2 is a plot of B/H loops of the sandwich structure of FIG. 1.

FIG. 2 shows B/H loops 30 and 33 of the sandwich structure 20. The sandwich structure has a saturation magnetization ($B_S$) nearly that of the single layer of FeCoN at approximately 23.5 kilogauss. The coercivity of the hard axis, which is defined as the applied field of the loop 30 at which the magnetization is zero, is about 8 Oe while the coercivity of the easy axis is about 18 Oe as shown by loop 33.

Figure 3:
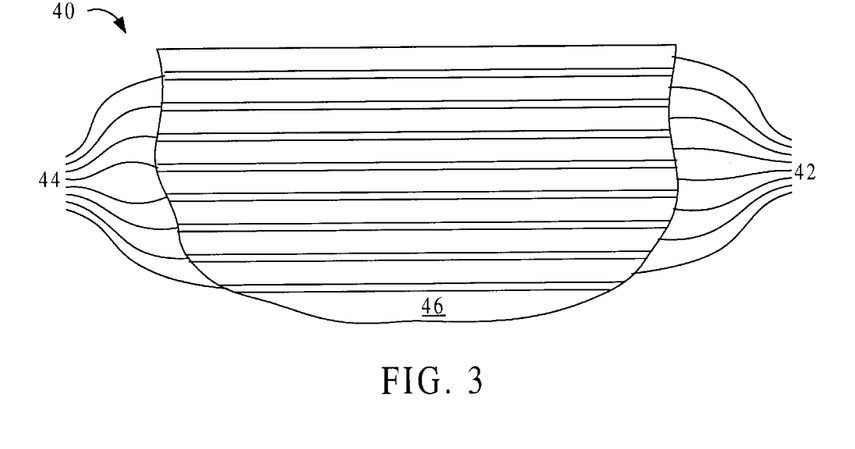
FIG. 3 is a cutaway cross-sectional view of a laminated structure made of a plurality of primarily iron FeCoN layers interleaved with a plurality of primarily iron FeNi layers.

FIG. 3 is a cutaway cross-sectional view of a laminated structure 40 made of a plurality of primarily iron FeCoN layers 42 interleaved with a plurality of primarily iron FeNi layers 44. The sandwich structure 20 is formed on a substrate 46 that provides a surface promoting favorable microstructural growth of layers 42 and 44. The FeCoN layers 42 each have a thickness of approximately 500 Å and a composition of approximately $Fe_{0.67}Co_{0.29}N_{0.04}$. The FeNi layers 42 each have a thickness of approximately 50 Å and have a composition of approximately $Fe_{0.55}Ni_{0.45}$. Layers 42 and 44 were formed by magnetron sputtering deposition on substrate 46 at room temperature. Various other compositions and thicknesses may also be suitable. For example, the FeCoN layers may have atomic concentrations of iron in a range between 50% and 70%, atomic concentrations of cobalt in a range between 25% and 40%, and atomic concentrations of nitrogen in a range between 0.4% and 11%. As another example, the FeNi layers may have atomic concentrations of iron in a range between 50% and 70%, and atomic concentrations of nickel in a range between 50% and 30%. The thickness of any of the layers may for example be in a range between a few angstroms and one hundred nanometers.

Figure 4:
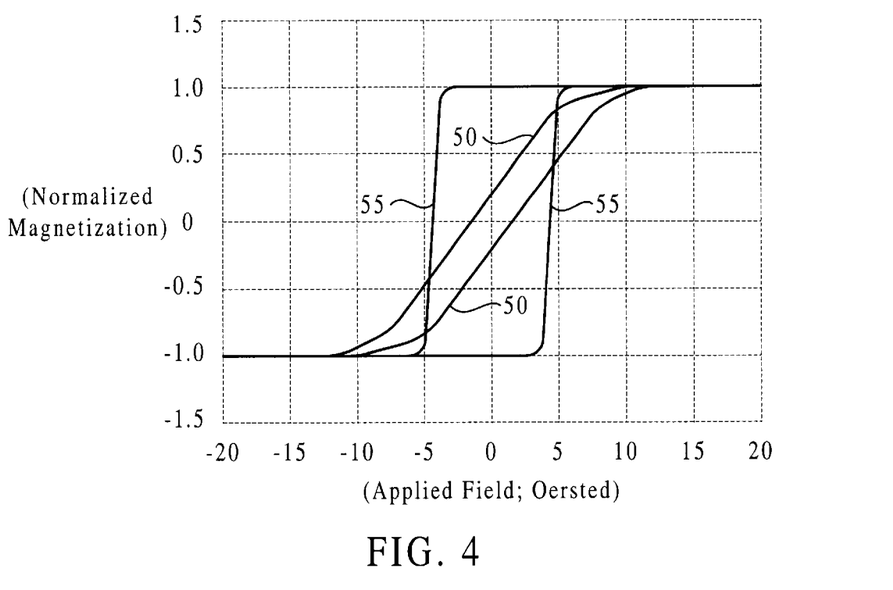
FIG. 4 is a plot of B/H loops of the laminated structure of FIG. 3.

FIG. 4 shows B/H loops 50 and 55 of the laminated structure 40 having eight layers made of FeCoN interleaved with eight layers made of FeNi. The laminated structure has a saturation magnetization ($B_S$) of approximately 23.5 kilogauss and a permeability of approximately 2500. The laminated structure has a hard axis coercivity of about 1.0 oersted, as shown by loop 50, and has an easy axis coercivity of about 4 oersted, as shown by loop 55. The well-defined uniaxial anisotropy and low hard axis coercivity of the laminated structure are suitable for many head applications, such as inductive transducer pole layers and pole tips.

The laminated structure was found to be under tensile stress of approximately 450 MPa, versus the compressive stress of approximately −300 MPa noted above for the prior art sandwich structure of Permalloy and FeCoN. The resistivity of the novel laminated structure was measured to be approximately 35 μΩcm, versus 55 μΩcm reported for the prior art sandwich structure of Permalloy and FeCoN. Both of these measurements indicate that the novel laminated structure has a substantially different microstructure than the prior art sandwich structure of Permalloy and FeCoN. A different laminated structure of FeCoN/FeNi having $Fe_{0.2}Ni_{0.8}$ layers in place of $Fe_{0.55}Ni_{0.45}$ layers was fabricated, but surprisingly was not as magnetically soft as the higher moment laminated structure characterized in FIG. 4.

Figure 5:
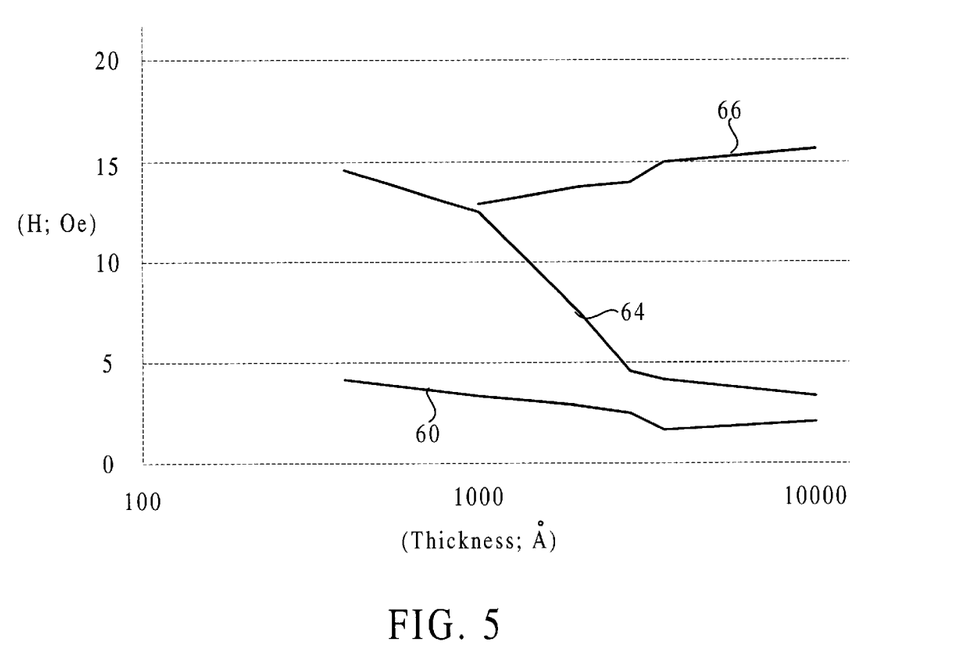
FIG. 5 is a plot of the hard axis coercivity, the easy axis coercivity, and the anisotropy field for laminated structures of FIG. 3 having various thicknesses.

FIG. 5 shows a plot of the hard axis coercivity 60, the easy axis coercivity 64, and the anisotropy field 66 for laminated structures thicknesses that are varied based upon the numbers of layers contained in the laminated structures.

Figure 6:
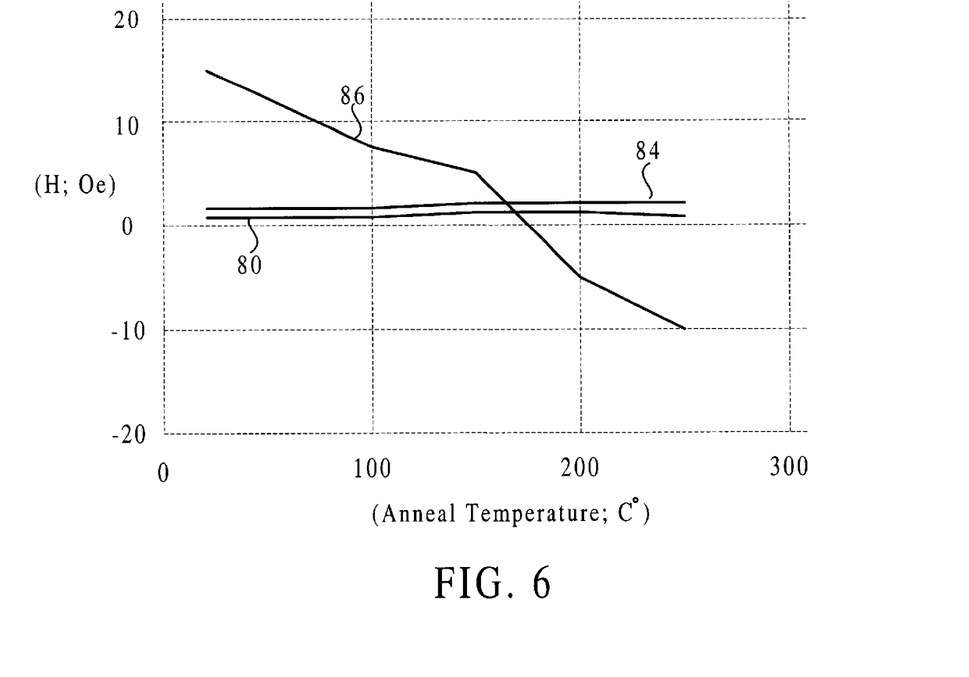
FIG. 6 is a plot of the hard axis coercivity, the easy axis coercivity, and the anisotropy field for samples of the laminated structure described above with reference to FIG. 3 after annealing the sample at various temperatures.

FIG. 6 is a plot of the hard axis coercivity 80, the easy axis coercivity 84, and the anisotropy field 86 for samples of the laminated structure described above with reference to FIG. 3 after annealing at various temperatures. A 600 Oe field was maintained in a direction essentially perpendicular to the easy axis of the film layers during annealing. The hard axis coercivity 80 and the easy axis coercivity 84 were essentially unchanged after annealing at up to 250° C. Also observed was that the moment of the samples did not change even after 250° C. annealing. These results suggest that the phase composition of the structure is stable at least to that temperature. The temperature of magnetic recording heads typically does not exceed 100° C., indicating that the laminated structure has good thermal stability for use in pole layers and pole tips. The anisotropy field 86 changes sign at about 180° C., indicating a switch of the hard and easy axis of uniaxial anisotropy at that temperature.

For use in a longitudinal recording head having a submicron nonferromagnetic gap separating first and second pole tips, the laminated structure can be sputtered onto the gap on the second or tailing pole tip, with the remainder of that pole tip formed by electroplating. For example, after magnetron sputtering several layers of $Fe_{0.67}Co_{0.29}N_{0.04}$ interleaved with several layers of $Fe_{0.55}Ni_{0.45}$ to form a laminated structure having a thickness on the order of 400 nm, a conventional plating seed layer such as Permalloy can be sputter-deposited, followed by electroplating with Permalloy or predominantly-iron NiFe to a thickness of 1–3 μm or more.

Figure 7:
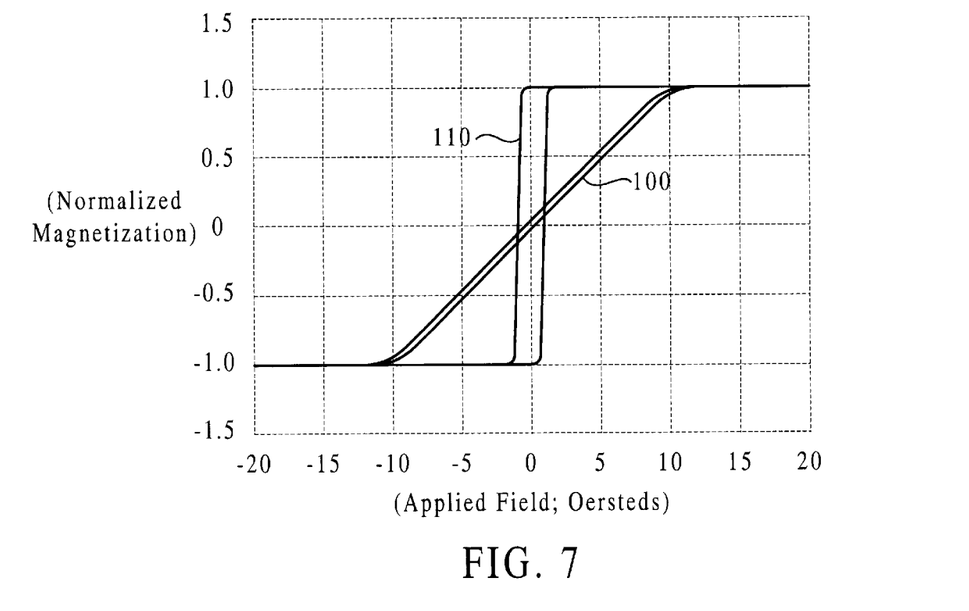
FIG. 7 is a plot of a hard axis loop 100 and easy axis loop 110 for a composite structure made of a layer of $Fe_{0.585}Ni_{0.415}$ having a thickness of approximately 3 μm that was electroplated on a laminated seed structure of $Fe_{0.67}Co_{0.29}N_{0.04}/Fe_{0.55}Ni_{0.45}$.

Alternatively, such a novel laminated structure can be used as a seed layer for electroplating high moment materials such as $Fe_{0.585}Ni_{0.415}$ or CoNiFe to create the remainder of a pole layer. FIG. 7 shows hard axis loop 100 and easy axis loop 110 for a composite structure made of a layer of $Fe_{0.585}Ni_{0.415}$ having a thickness of approximately 3 μm that was electroplated on a laminated seed structure of $Fe_{0.67}Co_{0.29}N_{0.04}/Fe_{0.55}Ni_{0.45}$. The composite structure may have an overall saturation magnetization of approximately 20 kilogauss, with the laminated seed portion having a saturation magnetization of about approximately 23.5 kilogauss.

Electroplating directly onto the laminated structure of $Fe_{0.67}Co_{0.29}N_{0.04}/Fe_{0.55}Ni_{0.45}$ can improve results compared to first depositing a Permalloy seed layer on the laminated structure before electroplating. In addition to providing a more simplified fabrication process, electroplating directly atop the laminated FeCoN/FeNi seed layer can yield better quality materials. For example, deposition of the laminated FeCoN/FeNi seed on a sloped surface, which may occur for instance near an apex region of a trailing pole layer, may produce a lower density film, perhaps due to an orientation mismatch between the growth surface and the growth direction. Such films may then be susceptible to etching by acid treatment prior to electroplating, causing the high Bs laminate in some cases to be rough with nanometer scale voids. Electroplating directly onto this laminate can fill in these voids, yielding a high quality magnetic layer. For the case in which a Permalloy seed layer is first deposited atop the laminated FeCoN/FeNi structure, pin holes in the Permalloy may allow etching of the laminated FeCoN/FeNi structure, which subsequent electroplating does not necessarily fill. In this case voids can remain in the laminated FeCoN/FeNi structure, reducing the quality and durability of the overall magnetic structure.

In one embodiment, the laminated structure of $Fe_{0.67}Co_{0.29}N_{0.04}/Fe_{0.55}Ni_{0.45}$ was formed in a Nordiko 9950 physical vapor deposition (PVD) system at room temperature. The distance between the substrate and the target was about 7 cm or less, and the power was set to 3.5 kW. The $Fe_{0.67}Co_{0.29}N_{0.04}$ layers were formed to a thickness of about 500 Å, and the $Fe_{0.55}Ni_{0.45}$ layers were formed to a thickness of about 50 Å.

Instead of alloys of primarily-iron FeCoN, an additional element can be added that increases resistivity. For example, FeCoRhN/NiFe laminated thin films have been fabricated to have similar magnetic performance to the FeCoN/NiFe laminates described above, but with increased resistivity. More generally, alloys containing $(Fe_A Co_B N_C)_{(1-Y)} X_Y$, where X is an element from the group including V, Cr, Ir, Ni, Rh, Mo, W, Nb and Ti, having atomic concentrations of $A \geq 0.5$, $B \leq 0.5$, $0 \leq C \leq 0.2$, $0 \leq X \leq 0.1$, with $A+B+C=1$, are believed to offer favorable magnetic performance.

Figure 8:
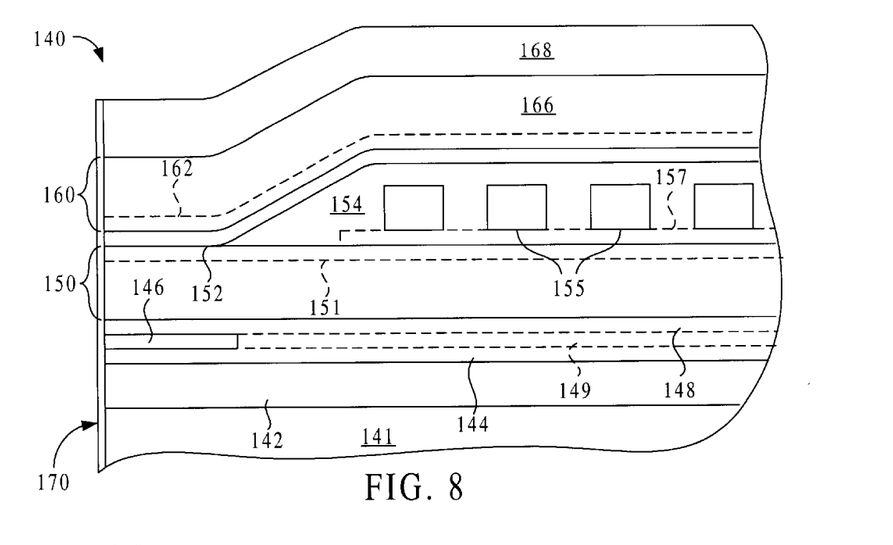
FIG. 8 is a cutaway cross-sectional view of a merged MR and inductive transducer employing magnetically favorable elements in accordance with the present invention.

Referring now to FIG. 8, a cutaway cross-sectional view of a merged MR and inductive transducer 140 employing magnetically favorable elements in accordance with the present invention is depicted. Although a merged transducer is depicted, the invention may instead be used for example in a separate inductive transducer, in a piggyback head or in other applications in which magnetically soft, high saturation magnetization materials are desirable. The transducer is formed on a wafer substrate 141, which may contain $Al_2O_3$, AlTiC, Si, SiC or other conventional materials. A first magnetically soft shield layer 142 is disposed atop the substrate 141. A first read gap layer 144 composed of electrically insulating, nonmagnetic material such as $Al_2O_3$ is disposed on shield layer 142.

A MR sensor 146 is disposed atop the first read gap layer 144, and a second read gap layer 148 composed of electrically insulating, nonmagnetic material such as $Al_2O_3$ is disposed on the MR sensor. The MR sensor 146 may include a single layer of anisotropic magnetoresistive (AMR) material such as Permalloy, or the sensor may contain plural or multiple layers of sensor materials as is known to form a spin valve (SV) sensor, giant magnetoresistive (GMR) sensor, dual stripe magnetoresistive (DSMR) sensor or other known types of sensing mechanisms. In other embodiments, such an MR sensor may involve spin-dependent tunneling (SDT) sensor. The MR sensor 146 may be trimmed to leave an insulating layer 149 formed of a dielectric such as $Al_2O_3$ distal to a media-facing surface 170.

A second magnetically soft shield layer 150 is disposed atop the second read gap layer 148, the second shield layer also serving in this merged transducer as a first write pole 150. In an alternative embodiment, a first write pole is separated from the second shield layer. The layer 150 may be formed of Permalloy or other materials having higher saturation magnetization, including magnetically soft, primarily-iron NiFe or FeXN, where X is an element such as Ta, Rh, Al, etc. The layer 150 may be electroplated and then polished to form a smooth surface, upon which a first laminated FeCoN/FeNi structure 151 can be formed. The laminated structure 151 includes layers of primarily-iron FeCoN interleaved with layers of primarily iron FeNi, and provides a magnetically soft high moment material upon which a submicron nonferromagnetic gap layer 152 is formed. The gap layer 152 separates the first write pole 150 from a second write pole layer 160, and magnetic flux communicated between the pole layers 150 and 160 can fringe out from the gap layer to write magnetic pattern on an adjacent media.

A second laminated FeCoN/FeNi structure 162 is formed on the gap layer 152. The laminated structure 162 includes layers of primarily-iron FeCoN interleaved with layers of primarily-iron FeNi, and provides a second magnetically soft high moment layer adjoining the nonferromagnetic gap layer 152. Having the laminated FeCoN/FeNi structure 162 adjoining a trailing edge of the gap layer 152 allows sharply defined, high density magnetic patterns to be written onto an adjacent media. Materials from which gap layer 152 can be made include dielectric materials such as $Al_2O_3$ or $SiO_2$ or metals such as chromium or tantalum. The gap layer 152 can serve as a seed layer promoting favorable deposition of the laminated FeCoN/FeNi structure 162.

An electrically conductive coil 155 is formed on an insulating layer 157 for inductively writing and/or reading signals via the pole layers. The coil is surrounded by baked photoresist 154 that provides insulation between coil sections and also provides a sloped surface that allows the pole layers 150 and 160 to be separated by several microns adjacent the coil 155 and less than one micron adjacent the media-facing surface 170. In another embodiment, a second pole layer can be substantially flat, with the magnetic core brought close to the gap by an additional magnetic layer, which may be termed a pedestal, adjoining either or both of the pole layers. In yet another embodiment, such a pedestal can be formed adjoining a second pole layer that curves in a similar fashion as pole layer 160, with the pedestal and pole layer stitched together adjacent to the media-facing surface 170.

The second laminated FeCoN/FeNi structure 162 is formed in a plurality of layers, beginning with a sputter-deposited layer of primarily-iron NiFe, which may be formed to a thickness of 20 Å–50 Å and at room temperature. Primarily-iron NiFe is defined in the present invention to be an alloy having a greater atomic concentration of iron than nickel, such as $Fe_{0.55}Ni_{0.45}$. Alternatively, the layer 162 may be formed on a layer of Cr having a similar thickness, in order to promote favorable growth of subsequently formed $Fe_{0.55}Ni_{0.45}$. In this case, or for the situation in which the gap layer 152 is made of Cr, it may be possible to form an initial layer of the laminated FeCoN/FeNi structure 162 of primarily-iron FeCoN. After formation of at least three layers of primarily-iron FeCoN interleaved with at least three layers of primarily-iron FeNi, a remainder 166 of pole layer 160 may be formed by electroplating. The electroplated layer 166 may be formed of Permalloy or other materials having higher saturation magnetization, including magnetically soft, primarily-iron NiFe or CoNiFe. Alternatively, pole layer 160 may be formed entirely of a magnetically soft laminated FeCoN/FeNi structure having high saturation magnetization, which may be feasible due to the relatively high deposition rate of approximately 22 Å/s afforded by magnetron sputtering, so that for example a laminated structure a few microns in thickness can be formed in less than one hour.

After formation of second pole layer 160, that layer may be masked and trimmed by a directional etching process such as IBE to define a trailing pole tip. The etching may be designed to also cut into the first pole layer 150, creating a leading pole tip that is aligned with the trailing pole tip. A protective coating layer 168 of $Al_2O_3$, diamond like carbon (DLC) or other hard materials is then formed on what will become a trailing end 175 of the head, after which the wafer substrate 141 and formed layers are diced into thousands of heads. A protective coating 168 has also been formed on the media-facing surface 170 of the transducer. The media-facing surface 170 is formed along one die edge. One should note that the MR sensor 146 may be formed after the formation of the inductive core that includes write poles 150 and 160, affording higher temperature processing of the write poles. In an alternative embodiment, sensing is performed inductively with the same transducer elements that are used to write magnetic patterns on the media, without the need for a MR sensor.

Figure 9:
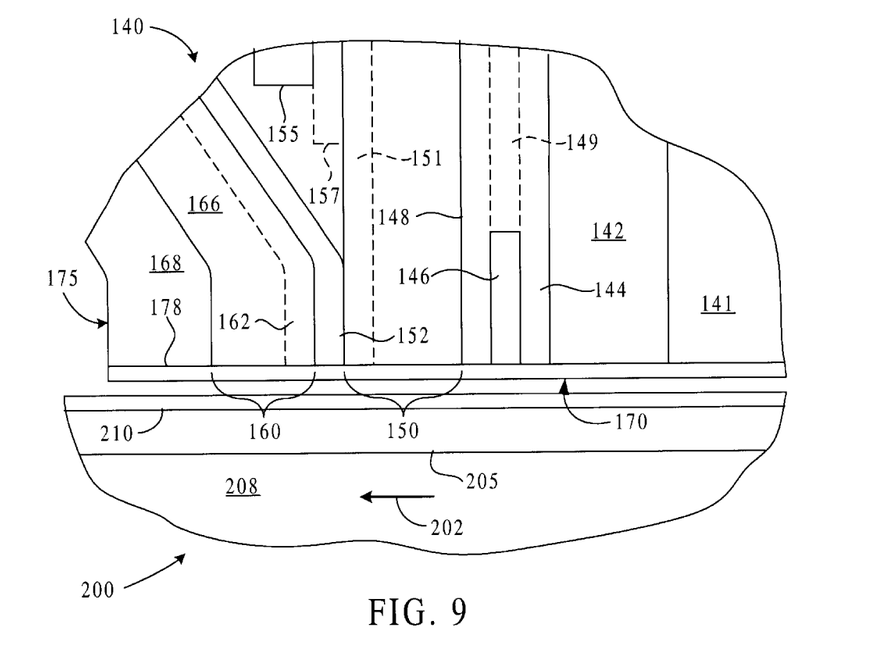
FIG. 9 is a cutaway cross-sectional view of the transducer of FIG. 8 disposed in close proximity to a media.

FIG. 9 shows the merged transducer 140 disposed in close proximity to a media 200 which is moving relative to the head as shown by arrow 202, from a leading end to the trailing end 175 of the head. The media 200 may be a disk or tape, for example, which includes a media layer or layers 205 disposed atop a substrate 208, with an overcoat layer 210 protecting the media layer 205. The write poles 150 and 160 form a magnetic circuit or loop to encourage the flow of magnetic flux across the write gap layer 152. An electrical current flowed through the coil 155 induces a magnetic flux in the write layers that travels across the nonferromagnetic gap 152 to write a magnetic bit in the media layer 205. The MR sensor 146 can read magnetic bits that have been written on the media.

Figure 10:
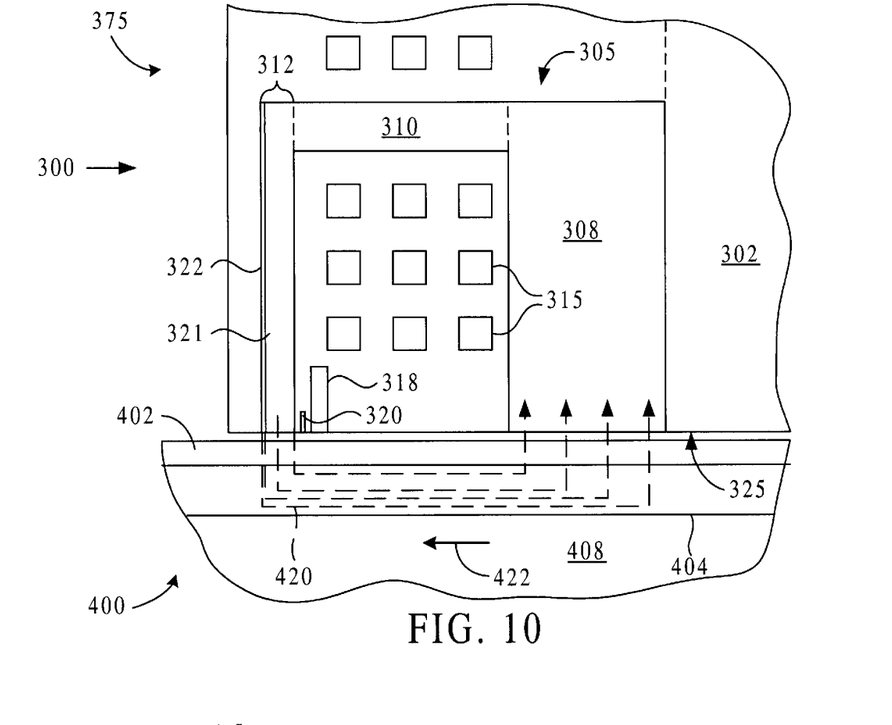
FIG. 10 is a cutaway cross-sectional view of a transducer 300 designed for perpendicular recording on a media 400.

FIG. 10 is a cutaway cross-sectional view of a transducer 300 designed for perpendicular recording on a media 400. The transducer 300 is formed on a wafer substrate 302, and has a generally U-shaped ferromagnetic core 305 that includes a relatively large flux return pole layer 308, a smaller write pole layer 312, and a magnetic stud layer 310 connecting the pole layers 308 and 312. A conductive coil including three layers in this embodiment winds around the magnetic stud 310. An MR sensor 320 is disposed adjacent a media-facing surface 325 between a magnetically soft shield layer 318 and the write pole layer 312. In this design as well as the previous embodiment a thin protective coating layer may be disposed on the media-facing surface 325, protecting the MR sensor 320 from damage and corrosion.

The media 400 may be a disk or tape, for example, which includes a media layer or layers 402 disposed atop a magnetically soft underlayer 404, which in turn is disposed atop a substrate 408. The underlayer 404 and core 305 form a circuit or loop for magnetic flux 420 that writes information on the media layers 402. The media 400 moves past the transducer 300 as shown by arrow 422, so that a leading end of the head encounters a portion of the media before a trailing end 375 of the head, the leading end formed by an edge of substrate 302 that is not shown in this drawing to instead illustrate the magnetic elements. The MR sensor 320 can read magnetic bits that have been written on the media 400.

The write pole layer 312 in this embodiment includes a first layer 321 that has been formed primarily by electroplating, and a second section 322 that is made of a laminated FeCoN/FeNi structure, each layer of the structure 322 including an atomic concentration of iron that exceeds 50%. In this type of perpendicular head the magnetic flux 420 is concentrated adjacent the relatively small write pole layer 312 and is spread out adjacent the relatively large flux return pole layer 308. The trailing end of the write pole layer 312 is the last magnetic element encountered by the media 400 that moves past the transducer 300. Having a magnetically soft, high magnetic saturation structure 322 disposed at the trailing end of the write pole layer 212 allows concentrated magnetic flux 420 adjacent to that structure 322 to leave a sharp and lasting magnetic pattern on the media 400. The underlayer 404 may also include magnetically favorable elements containing FeCoN/FeNi layers.

Although the present disclosure has focused on teaching the preferred embodiments, other embodiments and modifications of this invention will be apparent to persons of ordinary skill in the art in view of these teachings. For example, the primarily-iron laminates of FeCoN/FeNi can be employed in various devices that benefit from high saturation magnetization, magnetically soft materials, such as magnetic sensors, magnetic force microscopes, magnetic switches, etc. Therefore, this invention is to be limited only by the following claims, which include all such embodiments and modifications when viewed in conjunction with the above specification and accompanying drawings.

What is claimed is:

1. A device comprising:
   a first plurality of layers containing FeCoN having an atomic concentration of iron that is greater than an atomic concentration of cobalt, and having an atomic concentration of nitrogen that is less than said atomic concentration of cobalt; and
   a second plurality of layers containing FeNi having an atomic concentration of iron that is greater than an atomic concentration of nickel;
   wherein said first and second plurality of layers are interleaved to form a structure having an easy axis of magnetization and a hard axis of magnetization, having a magnetic saturation of at least about twenty-three-thousand Gauss, and having a magnetic coercivity measured substantially along said hard axis of less than two Oersted.

2. The device of claim 1, wherein said first plurality of layers contain $(Fe_A Co_B N_C)_{(1-Y)} X_Y$, where X is an element from the group including V, Cr, Ir, Ni, Rh, Mo, W, Nb and Ti, having atomic concentrations of $A \geq 0.5$, $B \leq 0.5$, $0 \leq C \leq 0.2$, $0 \leq X \leq 0.1$, and wherein $A+B+C=1$.

3. The device of claim 1, wherein said first plurality of layers contain approximately $Fe_{0.67}Co_{0.29}N_{0.03}$.

4. The device of claim 1, wherein said second plurality of layers contain approximately $Fe_{0.55}Ni_{0.45}$.

5. The device of claim 1, wherein said structure has a smallest dimension that is greater than one micron.

6. The device of claim 1, wherein said structure has been formed by magnetron sputtering.

7. The device of claim 1, wherein said structure is a magnetic pole layer that is disposed adjacent to at least one electrically conductive coil section of an inductive transducer.

8. A device comprising:
   a solid body having a leading end, a trailing end and a media-facing surface;
   an electrically conductive coil disposed in said body and including a plurality of adjacent coil sections oriented substantially parallel to each other; and
   first and second pole layers disposed in said body adjacent to said coil sections, said second pole layer disposed closer than said first pole layer to said trailing end, at least one of said pole layers including a structure having a plurality of FeCoN films interleaved with a plurality of FeNi films, each of said films having an atomic concentration of iron that is at least fifty percent, magnetic saturation of at least about twenty-three-thousand Gauss, and having a magnetic coercivity measured substantially along said hard axis of less than two Oersted.

9. The device of claim 8, wherein said plurality of FeCoN films contain $(Fe_A Co_B N_C)_{(1-Y)} X_Y$, where X is an element from the group including V, Cr, Ir, Ni, Rh, Mo, W, Nb and Ti, having atomic concentrations of $A \geq 0.5$, $B \leq 0.5$, $0 \leq C \leq 0.2$, $0 \leq X \leq 0.1$, and wherein A+B+C=1.

10. The device of claim 8, wherein said plurality of FeCoN films contain approximately $Fe_{0.67} Co_{0.29} N_{0.04}$.

11. The device of claim 8, wherein said plurality of NiFe films contain approximately $Fe_{0.55} Ni_{0.45}$.

12. The device of claim 8, wherein said structure has a smallest dimension that is greater than one micron.

13. The device of claim 8, wherein said structure has been formed by magnetron sputtering.

14. The device of claim 8, wherein said first pole layer is separated from said second pole layer by a submicron, nonferromagnetic gap.

15. The device of claim 8, wherein said one pole layer includes an electroplated ferromagnetic layer having a thickness greater than that of said structure.

16. The device of claim 8, wherein said structure is formed on a leading edge of said one pole layer.

17. The device of claim 8, wherein said structure is formed on a trailing edge of said one pole layer.

18. A device comprising:
   a solid body having a leading end, a trailing end, and a media-facing surface;
   an electrically conductive coil disposed in said body and including a plurality of adjacent coil sections oriented substantially parallel to each other; and
   a magnetic loop substantially encircling and electrically isolated from said coil sections, said loop including first and second ferromagnetic pole tips that are disposed adjacent to said media-facing surface and separated from each other by nonferromagnetic material,
   wherein at least one of said pole tips includes a plurality of primarily-iron, cobalt-containing layers interleaved with a plurality of primarily-iron, nickel-containing layers, such that said pole tip has a magnetic saturation in excess of 23-kiloGauss, a hard axis coercivity of less than 2 Oersted and a permeability of at least 1500.

19. The device of claim 18, wherein said plurality of primarily-iron, cobalt-containing layers include $(Fe_A Co_B N_C)_{(1-Y)} X_Y$, where X is an element from the group consisting of V, Cr, Ir, Ni, Rh, Mo, W, Nb and Ti, having atomic concentrations of $A \geq 0.5$, $B \leq 0.5$, $0 \leq C \leq 0.2$, $0 \leq X \leq 0.1$, and wherein A+B+C=1.

20. A device comprising:
   a first plurality of layers containing $(Fe_A Co_B N_C)_{(1-Y)} X_Y$, where X is an element from the group consisting of V, Cr, Ir, Ni, Rh, Mo, W, Nb and Ti, having atomic concentrations of $A \geq 0.5$, $B \leq 0.5$, $0 \leq C \leq 0.2$, $0 \leq X \leq 0.1$, and wherein A+B+C=1; and
   a second plurality of layers containing $Fe_S Ni_{1-S}$, having atomic concentrations of $S \geq 0.3$;
   wherein said first and second plurality of layers are interleaved to form a structure having an easy axis of magnetization and a hard axis of magnetization, having a magnetic saturation of at least about twenty-three-thousand Gauss, and having a magnetic coercivity measured substantially along said hard axis of less than two Oersted.

\* \* \* \* \*